May 21, 1946.   A. O. WILLIAMS   2,400,673
BRAKE CONSTRUCTION
Filed April 22, 1944   3 Sheets-Sheet 3

INVENTOR.
Alfred O. Williams
BY Walter E. Schirmer
ATTY.

Patented May 21, 1946

2,400,673

UNITED STATES PATENT OFFICE 2,400,673

BRAKE CONSTRUCTION

Alfred O. Williams, Battle Creek, Mich., assignor to Clark Equipment Company Buchanan, Mich., a corporation of Michigan Application April 22, 1944, Serial No. 532,331

7 Claims. (Cl. 188—106)

This invention relates to a brake construction, and more particularly is directed to a brake construction for the drive shaft of a rail vehicle such as a street car, subway or elevated car or similar vehicle where the driving motor is carried in the truck and has a drive shaft connected through suitable gearing to the truck axle.

One of the primary objects of the present invention is to provide a brake construction for the driving shaft preferably located adjacent the point at which the drive shaft extends into the axle housing, which construction will be effective for braking the drive shaft through the use of fluid pressure such as air pressure or the like controlled from the operator's cab of the vehicle, or which can be manually actuated if desired for engaging the brakes when it is desired to park the vehicle for repairs or under emergency conditions when the fluid pressure is not available.

Another object of the present invention is to provide a construction in which a cylindrical brake drum is secured to the drive shaft and is adapted to be engaged by oppositely arranged arcuate brake shoes pivotally mounted adjacent the axle housing, and arranged to be normally urged out of brake engagement by a spring arrangement but to be simultaneously forced into braking engagement under uniform pressure by the action of a fluid operated piston.

Another feature of the present invention is the provision of such a construction which is simple in design and operation, is capable of ready inspection and which can be easily assembled and disassembled to provide for maintenance and repair. In this connection the present construction also has the advantage of being designed so that it can be installed upon rail trucks now in use without requiring any material alteration of the associated parts of the truck.

Still another feature of the present invention is the provision of means arranged to provide for manual engagement of one of the brakes with the brake drum for parking or emergency purposes.

Other objects and advantages of the present invention will appear more fully from the following detailed description which, taken in conjunction with the accompanying drawings, will disclose to those skilled in the art the particular construction and operation of a preferred form of the present invention.

Figure 1:
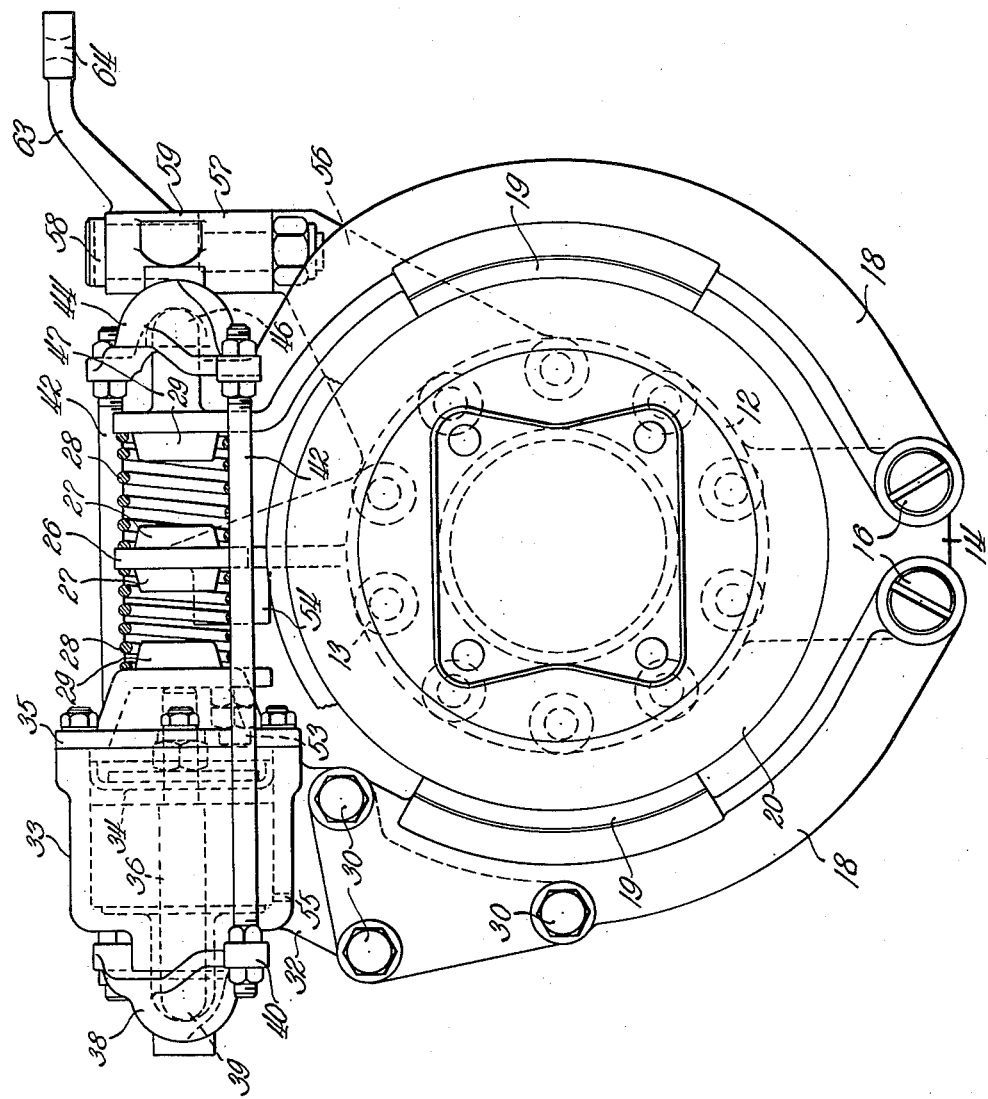
Figure 1 is an end elevational view of a brake mechanism according to the present invention.

Considering now the drawings in detail, there is provided an axle housing for the driving axle of the vehicle indicated generally by the reference numeral 5 and having an enlarged gear enclosing portion 6 terminating in a nose portion 7 through which extends the pinion shaft 8 leading to the driving pinion which engages the ring gear secured to the axle. The housing 5 is preferably provided with spring pots indicated generally at 9 and receiving coil or rubber springs of suitable design, this spring arrangement forming no part of the present invention.

Mounted on the nose portion 7 of the housing 6 is a supporting plate indicated generally at 12 which encircles the drive shaft 8 and is secured to the nose portion of the housing by means of the studs 13. The plate 12 adjacent its lower end is provided with a depending portion 14 having laterally spaced bosses 15 formed thereon through which are extended suitable pin members 16 carrying bushings 17 by means of which the adjacent ends of a pair of brake shoes 18 are pivotally supported on the pins 16. This provides for anchoring the two shoes 18 for pivotal movement at their adjacent lower ends, the shoes being provided with arcuate braking surfaces 19 suitably secured to the inner arcuate faces thereof and adapted to engage the external annular surface of a brake drum 20 which is provided with a radially inwardly extending flange 22 bolted or otherwise suitably secured to the flange 23 of a universal joint which connects the pinion shaft 8 to the propeller shaft extending toward the motor. Thus, the drum 20 is locked for conjoint rotation with the shaft 8. There is preferably provided a suitable shield or disc 24 also bolted by the same bolts to the inner face of the drum 20 for shielding the drum and the adjacent braking surfaces against any possibility of oil leakage out of the housing 7.

The plate 12 is also provided with a vertically extending flange portion 25 which has a vertically projecting portion 26 provided on its opposite faces with bosses 27 forming seats for a pair of coil spring members 28. The opposite ends of the spring members 28 are biased around suitable bosses 29 carried by the free adjacent ends of brake shoes 18. Thus, the springs 28 normally tend to urge the free ends of the brake shoes away from each other out of braking engagement with the surface of the drum 20.

Mounted adjacent the free end of one of the brake shoes 18 as by means of the studs 30 is a bracket member 32 having the cylinder 33 formed at the upper end thereof. The cylinder 33 is adapted to contain a suitable piston member indicated generally at 34 and is closed by an end cap member 35 bolted or otherwise secured thereto. The piston member 34 has a piston rod portion 36 extending outwardly of the end of the cylinder 33 and having seating engagement in the recess 37 of a connecting member 38. The connecting member or coupling 38 is thereby universally mounted about the end 39 of the piston rod 36 and is provided with oppositely extending ear portions 40 adapted to receive the ends of a pair of links 42 which, at their opposite ends, are secured to the ears 43 of a corresponding coupling member 44. The member 44 is provided with a semi-spherical recess 45 which is adapted to receive the spherical end 46 of a lug 47 formed integral with the end of the opposite brake shoe 18 and extending in line with the boss 29 at the end of the shoe 18.

It will be noted that the cap 35 for the cylinder 33 is provided with a frusto-conical portion 48 which terminates in the boss 29 forming a seat for one of the springs 28. The cap member also is provided with a laterally extending ear 50 guided for reciprocal movement upon the shank portion 52 of a stud 53 threaded into the enlarged portion 54 formed adjacent the upper end of the flange 25 of the supporting plate 12.

In the operation of the device as thus far described, upon admission of fluid under pressure into the interior of the cap member 35 the piston 34 is moved axially toward the outer end of the cylinder 33 thereby moving the piston rod 36 outwardly and tending to force the coupling member 38 away from the cylinder 33. However, this produces a tension on links 42 tending to draw the opposite brake shoe 18 into braking engagement with the surface of the drum 20. A corresponding reaction is introduced into the cylinder 33 and the cylinder 33 tends to move in a direction opposite to the movement of the piston 34 or inwardly against the spring 28. It is guided for movement in this direction by the connection of the ear 50 about the stud 53, thereby holding the shoe in alinement with the drum as it moves inwardly toward braking engagement. It will thus be seen that the cylinder 33 floats in position, the action produced by movement of the piston tending to draw the opposite shoe 18 into brake engagement counteracted by movement of the cylinder inwardly to move its associated shoe 18 into brake engagement. Thus, a uniform application of the brakes against the surface of the drum 20 is provided.

Preferably a suitable vent 55 is provided in the outer end of the cylinder 33 to relieve any possible back pressure on the back side of the piston 34.

Figure 2:
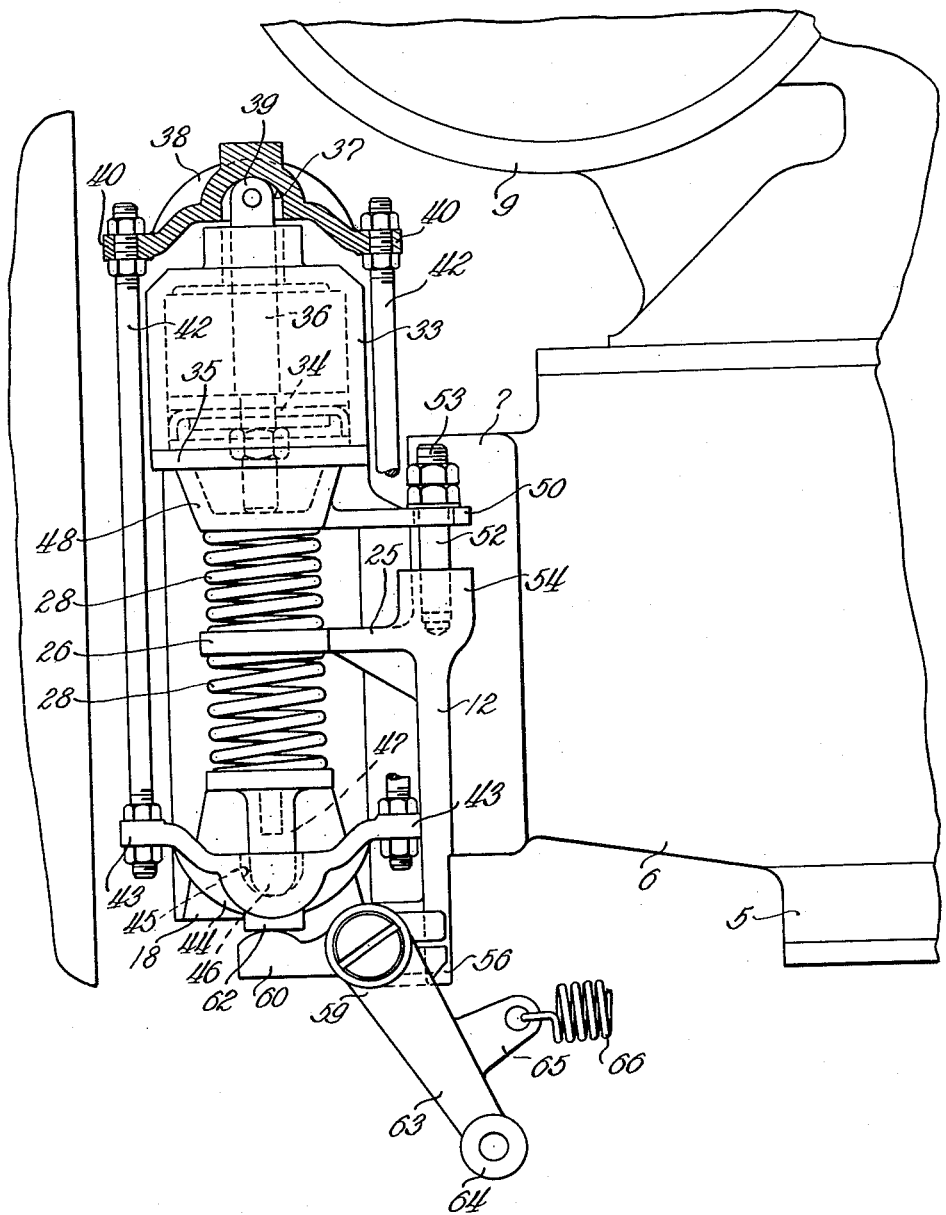
Figure 2 is a top plan view of the construction shown in Figure 1.
Figure 3:
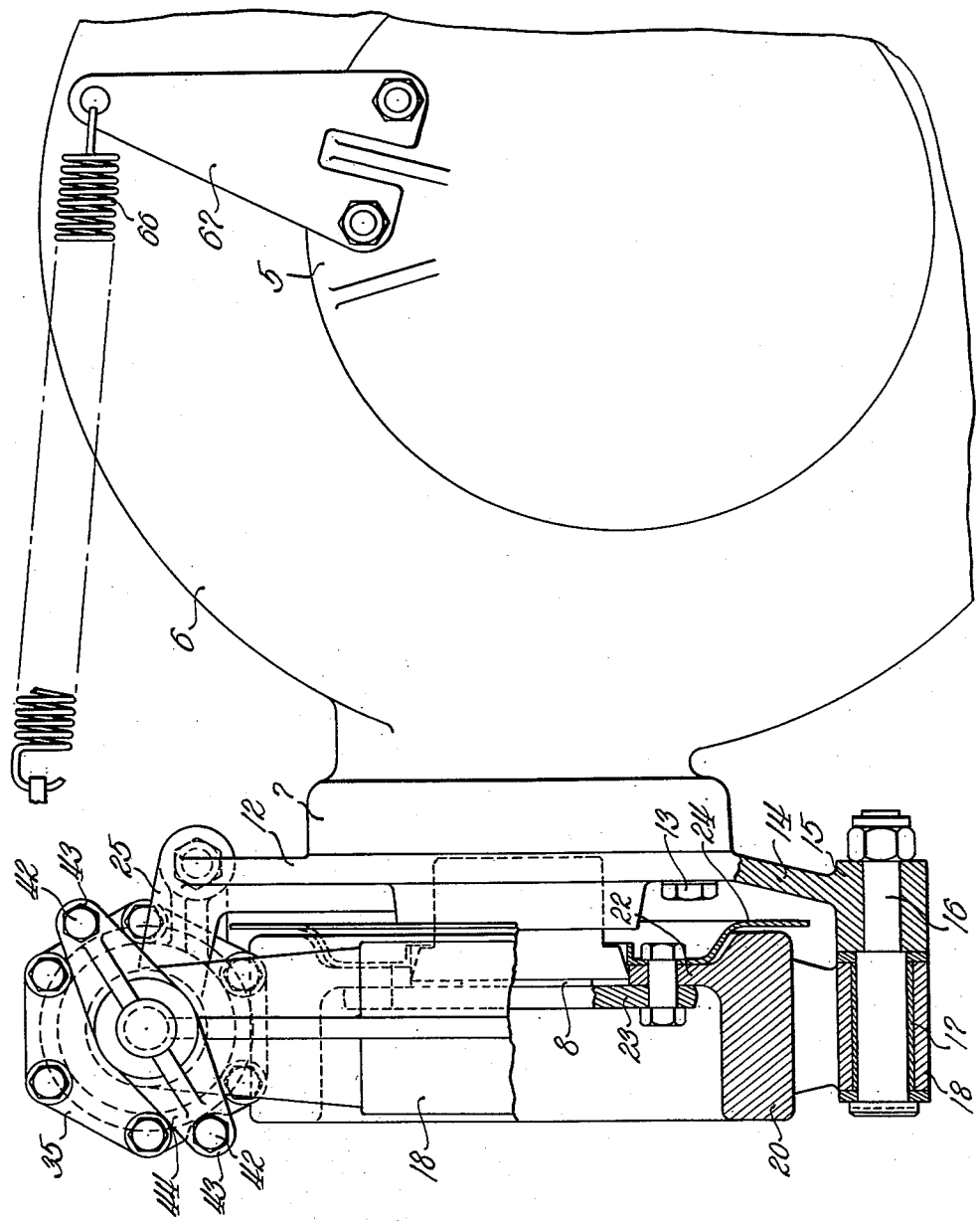
Figure 3 is a side elevational view, partly in section, of the structure shown in Figures 1 and 2.

The supporting plate 12 is also provided with an angularly extending flange portion 56 which terminates at its upper end in a forwardly extending boss portion 57 adapted to receive the pivot pin 58 mounted therein. The pin 58 above the boss portion 57 is adapted to carry a crank arm 59 as clearly shown in Figure 2, which crank arm 59 is in the form of a bell crank having one arm 60 thereof bearing against the boss portion 62 of the coupling member 44. The opposite elongated arm 63 of the bell crank 59 has at its end an eye portion 64 for receiving a cable connected to a hand brake operating mechanism whereby, upon rotation of the bell crank 59 in a clockwise direction as viewed in Figure 2, the arm 60 will force the coupling member 44 inwardly, forcing the associated shoe 18 into braking engagement. A suitable ear 65 on the arm 63 is arranged to receive one end of a return spring 66 which, at its opposite end as shown in Figure 3, is connected to a fixed support 67 anchored to the housing member 5. Suitable stop means may be provided for preventing the spring 66 returning the crank 59 beyond a limiting position.

It will therefore be apparent that with the present construction, pressure operation of the brakes results in uniform brake application of the two shoes against the drum 20 due to the floating cylinder construction and the fact that the ends of the shoes are connected through the coupling members 38 and 44 and the links 42. However, when the manually operated brake is actuated only one of the shoes is forced into braking engagement, that being the shoe associated with the coupling member 44 which is actuated with the bell crank 59.

In order to maintain the shoes so that they will pivot in the same plane with the drum 20, the ear 50 is provided riding upon the stud 53 so as to prevent movement of the shoes other than through the plane of the drum 20.

I am aware that certain changes may be made in details of the present construction, and I therefore do not intend to be limited except as defined by the scope and spirit of the appended claims.

I claim:

1. In combination, a rotatable brake drum, a pair of pivotally mounted arcuate brake shoes, means normally urging the free ends of said shoes away from each other, a cylinder carried on and movable with the free end of one shoe, a piston in said cylinder and connecting means including a coupler universally mounted on the free end of said piston, a corresponding coupler universally mounted on the free end of said other shoe, and tie rods interconnecting said coupler for conjoint movement whereby, upon introduction of fluid under pressure into said cylinder, said piston and said cylinders simultaneously move said free ends of said shoes toward each other.

2. In combination, a rotatable brake drum, a pair of pivotally mounted arcuate brake shoes, means normally urging the free ends of said shoes away from each other, a cylinder carried on and movable with the free end of one shoe, a piston in said cylinder, means connecting said piston to the free end of the other shoe whereby upon introduction of fluid under pressure into said cylinder, said piston and said cylinder simultaneously move said free ends of said shoes toward each other, and a bell crank pivotally mounted adjacent the free end of said other brake shoe and operable to actuate said shoe independently of said fluid pressure.

3. In a brake for a pinion shaft, a drum secured to said shaft, a fixed support plate having anchoring means, a pair of arcuate brake shoes pivotally mounted on said anchoring means and encircling said drum, a cylinder mounted on the free end of one shoe, a piston movable therein, a flange on said support plate between the free ends of said shoes, spring means seated on opposite faces of said flange and engaging said cylinder and the free end of the other shoe normally urging said shoes apart, said piston having a rounded extension, an oppositely projecting extension on said other shoe, and means comprising couplers universally mounted on said extensions and interconnected by tie rods whereby upon admission of fluid under pressure into said cylinder said piston and cylinder are forced in opposite directions to engage said shoes with said drum.

4. In a brake for a pinion shaft, a drum secured to said shaft, a fixed support plate having anchoring means, a pair of arcuate brake shoes pivotally mounted on said anchoring means and encircling said drum, a cylinder mounted on the free end of one shoe, a piston movable therein, a flange on said support plate between the free ends of said shoes, spring means seated on opposite faces of said flange and engaging said cylinder and the free end of the other shoe normally urging said shoes apart, said piston having an extension and interconnecting means between said extension and said free end of said other shoe whereby upon admission of fluid under pressure into said cylinder said piston and cylinder are forced in opposite directions, guide means on said cylinder, and a guide on said plate engaged thereby for restraining said shoes from movement out of the plane of said drum.

5. In a brake for a pinion shaft, a drum secured to said shaft, a fixed support plate having anchoring means, a pair of arcuate brake shoes pivotally mounted on said anchoring means and encircling said drum, a cylinder mounted on the free end of one shoe, a piston movable therein, a flange on said support plate between the free ends of said shoes, spring means seated on opposite faces of said flange and engaging said cylinder and the free end of the other shoe normally urging said shoes apart, said piston having an extension and interconnecting means between said extension and said free end of said other shoe whereby upon admission of fluid under pressure into said cylinder said piston and cylinder are forced in opposite directions, a pivotal support formed on said plate, and manually operable means carried thereby for independently actuating one of said shoes.

6. In a brake for a pinion shaft, a drum secured to said shaft, a fixed support plate having anchoring means, a pair of arcuate brake shoes pivotally mounted on said anchoring means and encircling said drum, a cylinder mounted on the free end of one shoe, a piston movable therein, a flange on said support plate between the free ends of said shoes, spring means seated on opposite faces of said flange and engaging said cylinder and the free end of the other shoe normally urging said shoes apart, said piston having an extension and interconnecting means between said extension and said free end of said other shoe whereby upon admission of fluid under pressure into said cylinder said piston and cylinder are forced in opposite directions, a bell crank pivotally mounted on said plate, said bell crank having a portion engaging the free end of one of said shoes for forcing it independently into engagement with said drum.

7. In a shaft brake construction, a rotatable brake drum, a pair of pivotally mounted arcuate brake shoes encircling said drum, a cylinder mounted in the free end of one of the shoes and having a piston therein, couplers universally mounted on said piston and on the free end of said other shoe, tie rods interconnecting said couplers to provide conjoint movement of said other shoe and said piston, and manually operable means for engaging the coupler on said other shoe to actuate said shoe independently of said piston.

ALFRED O. WILLIAMS.